Figure 17:
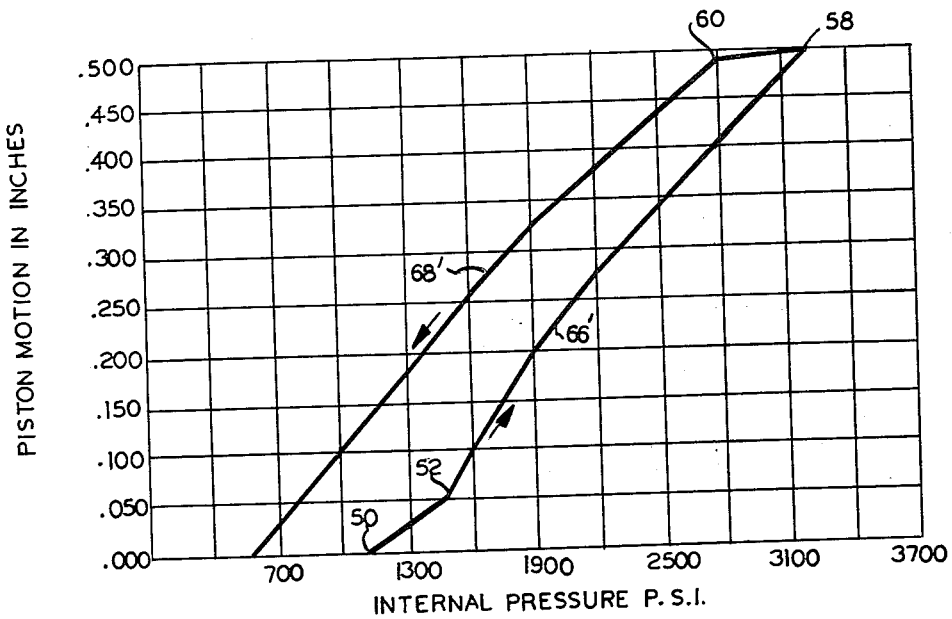

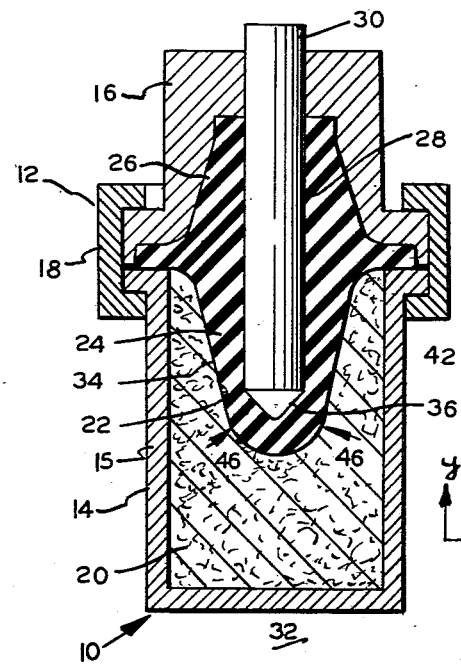

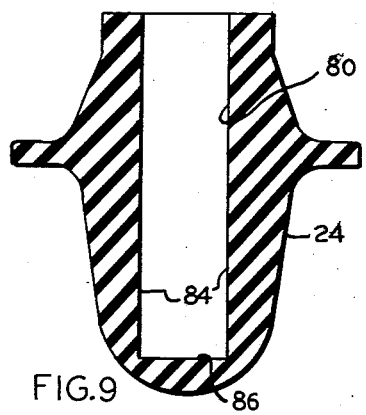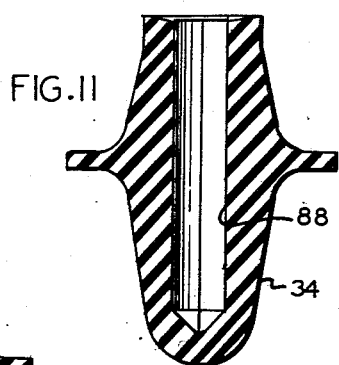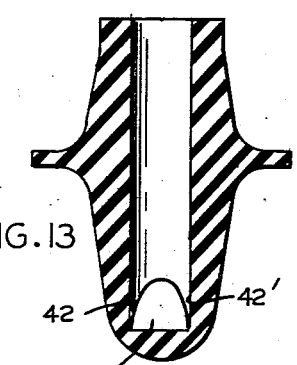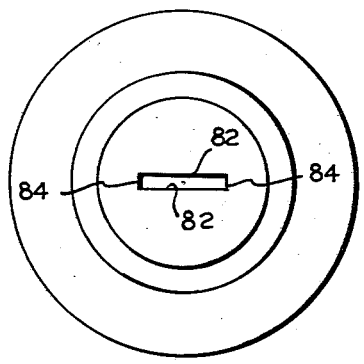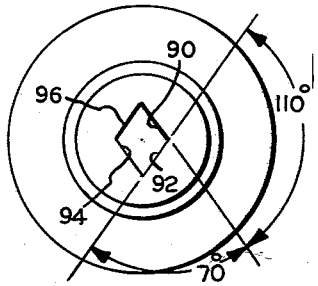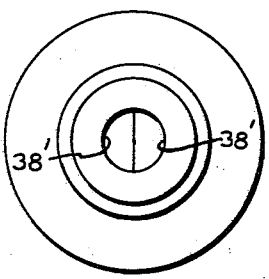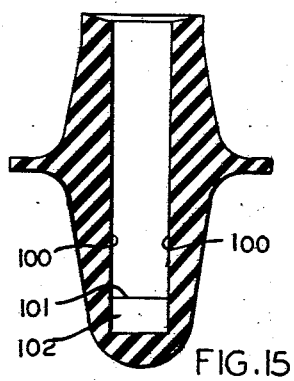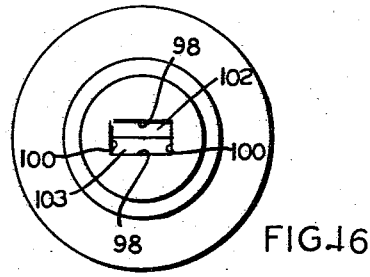

United States Patent Office 3,064,477
Patented Nov. 20, 1962

3,064,477
POWER ELEMENT
Sergius Vernet, Yellow Springs, Ohio, assignor to Antioch College, Yellow Springs, Ohio, a corporation of Ohio
Filed Feb. 26, 1960, Ser. No. 11,291
5 Claims. (Cl. 73—368.3)

This invention relates to power elements and particularly to power elements wherein a pressure-producing material is utilized within a container structure to operate on a contained force-transmitting material of rubber or other similar deformable character so as to drive a guided piston outwardly from the container structure for the performance of a useful mechanical motion. Power elements of this type are utilized principally for operating control devices such as electric switches and fluid control vales in various fields of operation, as for example in water line thermostats of internal combustion engine cooling systems and thermostatic mixing valves for domestic clothes washing machines.

In the conventional power elements of the above-mentioned type the development of pressure within the power element container is usually obtained by employing a contained thermally expansible material such as wax, paraffin, dichlorobenzine, etc., in association with a force-transmitting rubber plug and/or diaphragm structure. Such plug-diaphragm structures serve to seal the expansion material within the power element casing and to act as a mechanism for transmitting the pressure developed by the expansion material to the piston. The force-transmitting plugs and diaphragms, as usually constructed, offer considerable resistance to deformation by the expansion material, and in many cases a considerable pressure is required to be developed before substantial motion of the piston is obtained. The high pressure requirement of these plugs and diaphragms is such that the motion transmitted to the operated element (such as a switch or valve) in many cases lags considerably behind the development of pressure by the expansion material so that the operated element does not respond rapidly to changes in the condition sensed by the pressure-producing material. This lag is experienced not only during the times when the control pressure is on the increase, but also during the times when the control pressure is decreasing; as a result the operated device tends to lag behind the control pressure during the entire control cycle, with no substantial motion of the controlled device during a considerable portion of the operating cycle.

It is an object of the present invention to provide a power element wherein a relatively small internal pressure is required to obtain useful mechanical motion.

A further object of the invention is to provide a power element having a piston operated rapidly in response to variation in pressure within the power element casing.

A further object of the invention is to provide a power element including a reciprocable piston, wherein the pressure differential necessary to reverse the direction of motion of the piston is fairly small, thereby decreasing the time period during which the piston is motionless and providing improved time response to pressure change.

An additional object is to provide a power element wherein the initial development of internal pressure is effective to get the piston into motion at a fairly rapid initial rate, it being noted that in many of the prior art power elements considerable pressure losses were experienced in initiating the first stages of outward piston movement so that the piston in the initial stage had a fairly low and uncertain rate of motion.

Another object of the invention is to provide a power element having a relatively low hysteresis operating curve.

Other objects of this invention will appear in the following description and appended claims, reference being had to the accompanying drawings forming a part of this specification wherein like reference characters designate corresponding parts in the several views.

Figure 18:
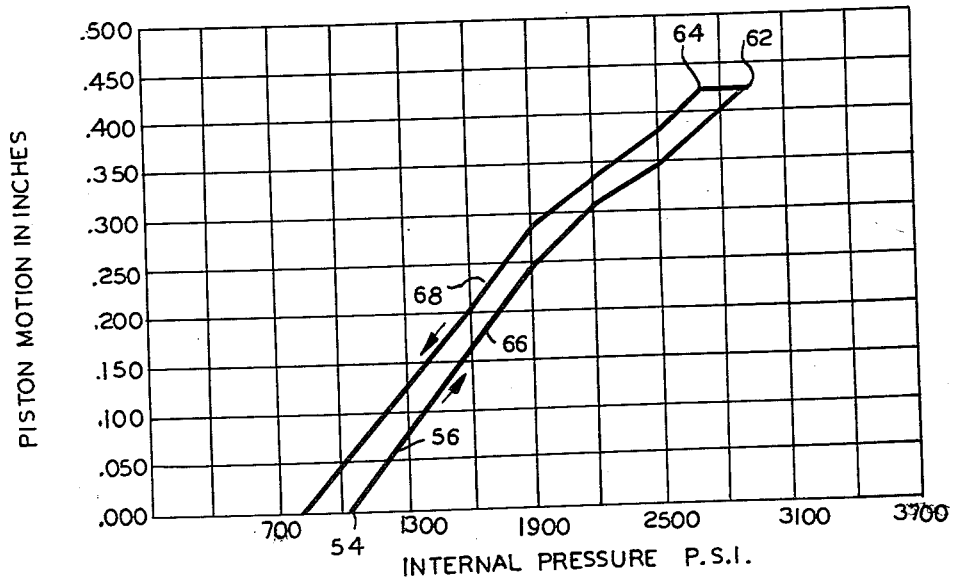

In the drawings:
FIGURE 1 is a cross sectional view taken through one embodiment of the invention;
FIG. 2 is a sectional view taken through a force-transmitting member utilized in the FIG. 1 embodiment;
FIG. 3 is a sectional view taken substantially along line 3—3 in FIG. 2;
FIG. 4 is a sectional view on line 4—4 in FIG. 2;
FIG. 5 is a sectional view on line 5—5 in FIG. 2;
FIG. 5a is a sectional view taken in a direction similar to FIG. 5 but through a device constructed without the feature of the present invention therein;
FIG. 6 is a sectional view on line 6—6 in FIG. 2;
FIG. 7 is a sectional view through a force-transmitting member employed in a second embodiment of the invention;
FIG. 8 is a bottom plan view of the member shown in FIG. 7;
FIG. 9 is a sectional view through a force-transmitting member employed in another embodiment of the invention;
FIG. 10 is a top plan view of the FIG. 9 member;
FIG. 11 is a sectional view through a force-transmitting member utilized in still another embodiment of the invention;
FIG. 12 is a top plan view of the FIG. 11 member;
FIG. 13 is a sectional view through a force-transmitting member utilized in an additional embodiment of the invention;
FIG. 14 is a top plan view of the FIG. 13 member;
FIG. 15 is a sectional view through a force-transmitting member employed in another embodiment of the invention;
FIG. 16 is a top plan view of the FIG. 15 member;
FIG. 17 is a graph showing the operation of a power element similar in some respects to the FIG. 1 power element but not having the feature of the present invention incorporated therein; and
FIG. 18 is a graph showing the operation of the FIG. 1 embodiment.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, and particularly FIGS. 1 through 6, there is disclosed a thermostatic power element 10 including a casing 12 defined by a copper cup element 14, a brass piston guide 16, and an aluminum retainer ring 18.

Positioned within cup 14 is a solid pellet 20 comprised of thermally expansible material such as wax and finely dispersed metal particles such as copper or aluminum, said dispersed particles serving to quickly transmit ambient temperature change to all portions of the pellet. The pellet is formed with a concavity 22 for receiving the sock portion 24 of the rubber force-transmitting member 26 in spaced relation to the cup annular wall 15. Member 26 is in turn formed with a central bore or concavity 28 for reception of the steel piston 30.

In operation of the FIG. 1 power element, temperature increase in the atmosphere 32 surrounding the container portion 14 is effective to thermally expand and fuse the wax-copper pellet 20 so that the pellet develops increased pressure on the external surfaces 34 of member 26. These external pressures are directed through sock portion 24 so as to develop a squeezing pressure on the conical piston surface 36, the action being such as to drive the piston upwardly through the guide 16 for performing useful work on a device such as a valve or switch (not shown). During temperature decrease in the atmosphere 32 an external spring or other pressure-developing arrangement acts on the piston 30 to drive it downwardly into the casing 12 to its illustrated position.

It will be understood that in the FIG. 1 embodiment movement of the piston 30 is controlled and developed by the pressure obtained in the pellet 20 as determined by the temperature of atmosphere 32. Thus, the FIG. 1 embodiment constitutes a thermostatic power element. The development of pressure on the external surface 34 of the sock 24 can be achieved by other means than an expansible-contractable pellet 20 as shown in FIG. 1. Thus, the pressure differential can be developed from a remote point by pumping pressure fluid into cup 14 through a line (not shown), such a construction usually being termed a pressurestat.

Whatever structure and procedure is utilized to obtain the pressure within cup 14, the force-transmitting member 26 must be collapsed by the external pressures thereon before the pressures can be transferred onto the piston 30 for motion-producing purposes. In prior art arrangements collapse of the force-transmitting member has been achieved with some difficulty and with a considerable pressure loss. However the FIG. 1 construction utilizes a novel construction of the lower portion of the sock 24 for obtaining a fairly rapid and satisfactory collapse thereof in response to the development of pressure on the sock external surfaces. The tip 36 of the piston is of generally conical configuration as in conventional practice, but the engaged surfaces of the sock portion are of a special configuration such as to readily collapse together on the development of an increased pressure at 34.

Thus, as will be seen from FIGS. 4, 5 and 6, the sock internal surfaces below the cylindrical surface of bore 28 define the generally elognated surfaces 38 and the generally shortened surfaces 42. The surfaces 38 and 42 of course define a cylindrical configuration at the connection thereof with the cylindrical surface of bore 28 (as shown in FIG. 4), but as the surfaces converge together the surface portions 38 maintain substantially the same dimension in the arrow $y$ direction while the surfaces 42 gradually become shorter in the $x$ direction. At the lower end of the concavity 28 the surfaces 42 become substantially points, while the surfaces 38 maintain their dimensions in the $y$ direction. As a result of this construction, when external pressures are applied onto the lower end portion of the sock (as indicated by the arrows 46) the surfaces 38 collapse readily together at a relatively rapid rate. The character of surfaces 42 is such that these surfaces do not offer substantial resistance to the collapsing of surfaces 38 against one another. This is in contrast to prior art arrangements wherein the sock portion is formed with a bore having an end configuration corresponding to the contour of the lower end of the piston (i.e., conical in the usual case).

FIG. 5a shows a section through the sock of a power element identical with the FIG. 1 element except that the sock bore has its lower end conically configured to fit the conical end of the piston, as under conventional practice; FIG. 5a is taken along the same line as FIG. 5. It will be noted that in the FIG. 5a construction the development of increased pressure on the external surfaces of the sock requires the internal conical surfaces of the sock to be bunched or condensed together at substantially all points thereof engaged with the conical piston tip. The various conical sock surfaces oppose one another in attempting to be collapsed together since, as will be apparent from FIG. 5a, the conical surfaces must corrugate or rapidly distort into a series of ridge surfaces and valley surfaces in order to fight one another and achieve the desired zero void space volume below the tip of the piston as it is driven upwardly in the guide bore. The positions of the conical surfaces as they fight to obtain the zero volume are approximated by the dotted lines in FIG. 5a.

In operation of the FIG. 5a structure the development of an initial pressure on the external surfaces of the sock causes the initial pressure to be opposed by the character of the sock, and consequently the pressure must be elevated through a relatively large amount before a satisfactory piston motion is obtained. FIG. 17 shows the performance of the FIG. 5a power element, and FIG. 18 shows the performance of the FIG. 1 embodiment of the present invention.

Referring to FIG. 17, it will be noted that the piston starts to move outwardly when the internal pressure is increased to approximately 1,000 p.s.i., as denoted by the reference numeral 50. Continued pressure increase causes a relatively slight outward movement of the piston until the pressure reaches approximately 1500 p.s.i., at which time the piston has advanced about .060 inch as denoted by numeral 52. The movement of the piston from the zero position to the numeral 52 position is relatively slow since a substantial pressure build-up is required to effect such movement. In many situations it is desirable to develop a faster motion than that obtained by the conventional construction.

Referring to FIG. 18, it will be noted that the piston thereof begins to move from the zero position at about 1,000 lbs. pressure as denoted by numeral 54. This pressure corresponds substantially with the initial pressure required with the FIG. 17 construction. However, it will be seen that for the FIG. 18 construction to advance the piston outwardly .060 inch as denoted by numeral 56, the internal pressure must only be increased to approximately 1250 lbs., in contrast to the 1500 lb. pressure requirement of the FIG. 17 construction. Thus the initial movement of the piston in the FIG. 18 construction is relatively rapid and the power element is thereby more quickly responsive to change in the sensed condition. It has also been found that with the invention arrangement there is greater reproducibility of performance; i.e., differences in operating conditions have less tendency to vary the character of the curve, especially at the beginning of the movement.

Referring again to the construction of FIG. 17, it will be noted that when the maximum pressure of approximately 3200 p.s.i. is developed as denoted by numeral 58, a considerable reduction in pressure is required before any substantial inward movement of the piston is obtained. Thus the internal pressure must be reduced to approximately 2800 p.s.i., as denoted by numeral 60 before substantial movement of the piston inwardly into the casing is obtained. The pressure differential required to reverse the piston direction is therefore slightly more than 400 p.s.i., (3200 p.s.i. minus 2800 p.s.i.). Such a pressure differential results in a somewhat a sluggish operation of the piston in response to changes in the sensed condition so that the power element is in many installations not entirely satisfactory.

With reference to FIG. 18 it will be noted that when the maximum pressure of about 2900 p.s.i. has been reached as denoted by numeral 62, the pressure need only be decreased to about 2740 p.s.i., as denoted by numeral 64 in order to initiate inward movement of the piston. The FIG. 18 construction therefore requires only a pressure differential of about 160 p.s.i. in order to reverse the direction of piston movement (2900 minus 2740). As a result, the power element of FIG. 18 is much better enabled to respond to changes in sensed condition than the FIG. 17 construction.

It will be appreciated that in use of each power element the piston does not necessarily move to the outer limit of its motion during each cycle. In many installations the piston fluctuates in the intermediate range of motion. However, it will be noted that the piston in the FIG. 18 arrangement can at substantially any point in its movement reverse direction more easily than the piston in the FIG. 17 arrangement, since the performance line 66 of the FIG. 18 piston during its outward motion is relatively close to the performance line 68 taken by the piston during its inward motion as compared with the spacing between the performance lines 66' and 68' in the FIG. 17 arrangement.

It is believed that the differences in performance between the FIG. 17 and FIG. 18 arrangements are occasioned by the pressure losses sustained at the intial movement of the piston. Thus, during the initial pressure development in the FIG. 17 arrangement, considerable pressure losses are obtained, i.e., considerable pressure is required to be placed on the lower portion of the sock to give it the corrugated form (FIG. 5a) necessary to drive the piston outwardly. After the piston has been driven outwardly by an appreciable distance any reduction in internal pressure has the effect of uncorrugating the sock instead of allowing the piston to be moved inwardly immediately (i.e., the large pressures stored up by the corrugating operation are released to give the "uncorrugating" action before the external spring can begin to drive the piston into the element).

In the FIG. 18 arrangement the initial pressure losses are not encountered to the same extent in the lower portion of the sock, since the opposed surfaces 38 (FIG. 6) can be collapsed together with relatively slight pressure at 46; as a result, the piston is not opposed in its inward motion to the same extent as in the FIG 17 arrangement, and the piston can move inwardly in response to a relatively small decrease in internal pressure.

The FIG. 1 construction thus is quite advantageous in developing a satisfactory piston movement, both during the initial outward piston motion and during initiation of the return piston movement, so that the power element is provided with a very satisfactory response to change in the condition being sensed.

It will be appreciated that various modifications and changes in design may be resorted to from that shown in FIG. 1 without departing from the spirit of the invention. Thus, the construction shown in FIGS 7 and 8 may be readily employed in practicing the "low pressure" features of the invention. The FIG. 7 force-transmitting member (and the other members shown in FIGS. 9 through 16) may be utilized with a power element of the same construction as shown in FIG. 1, and in the interest of emphasizing the features of the invention the power element casing is omitted from the showing of FIG. 7.

Referring to the FIG. 7 embodiment, it will be noted that the sock portion 24 is provided with the ribs 70 at diametrically spaced areas along its length. The interior surface of the FIG. 7 sock defines a cylindrical bore 72 and a conical end wall 74. The FIG. 7 construction is designed to accommodate a cylindrical piston having a conical tip similar to the piston 30 shown in FIG. 1.

In the installed position of the FIG. 4 member, when a high external pressure is applied to the sock, the sock areas 70 serve to stiffen and reinforce the sock so as to prevent it from readily collapsing in the x—x direction (FIG. 8); the collapsing forces are thereby redirected to collapse the sock in the y—y direction. It will be noted that ribs 70 do not extend entirely to positions in lateral alignment with the extreme lower limit 76 of the piston-receiving cavity. However, these ribs do have a collapse-directing function during the entire collasping operation, since the rubber material of member 24 is cohesive and the resistance or rigidity which is set up in one part of the sock is transferred to the other parts adjacent thereto.

As the piston travels upwardly in bore 72 the ribs 70 serve to prevent the different areas adjacent thereto along the sock length from collapsing together, so that the areas in the y—y axis are enabled to squeeze the conical surfaces of the piston and collapse behind the piston. The diametrical reinforcements provided by the ribs 70 serve to cause the bore surfaces along the y—y direction to readily collapse against one another without the "fighting" tendencies exhibited by the bore surfaces in the FIG. 5a construction. The pressures stored up in the collapsing operation are comparatively small.

During reduction of the operating pressures the ribs 70 serve to maintain the x—x portions in relatively rigid conditions such that the y—y portions can be easily sprung apart by the tapering surfaces of the piston without necessity for first releasing any substantial stored up pressures as in the FIG. 5a construction. The result is a relatively quick piston return movement without requiring an excessive reduction in internal pressure such as is required in some of the conventional constructions. In lieu of using external ribs 70 similar advantageous results may be achieved by forming the sock with a generally elliptical external contour.

The embodiment shown in FIG. 9 is intended to operate within a power element casing constructed as shown in FIG. 1. The FIG. 9 device includes a sock portion 24 having a rectangularly cross sectioned cavity 80 therein which defines the elongated opposed surfaces 82 and the shortened connecting surfaces 84. The end surface 86 of the cavity is flat. The FIG. 9 embodiment is utilized with a cylindrical piston having a conical inner end similar to the piston shown in FIG. 1, the circumference defined by the four surfaces 82 and 84 being preferably slightly greater than the circumference of the piston. Thus in an illustrative example, a piston having a circumference of about .40 inch might be utilized with a force-transmitting member having a cavity circumference of about .43 inch. By constructing the force-transmitting member 24 with a relatively narrow slot-like cavity 80 the force-transmitting member is provided with a built-in force directing feature having the function of causing the member surfaces 82 to readily collapse against one another without substantial interference from the interconnecting surfaces 84. The result is such that the piston is enabled to be moved in and out of the power element with relatively low internal pressure changes.

The FIG. 11 construction is similar in many respects to the FIGS. 9 and 10 construction except that the piston-receiving bore 88 thereof is of a different cross section. Thus the bore is of generally diamond shape defined by the surfaces 90, 92, 94 and 96. During the development of pressure on the external surface 34 of the sock the surfaces 90 and 92 are reinforced against collapsing against one another since these surfaces would have to move through a relatively great angle of about 110° in order to effect such a collapse, and such angular movement is resisted by the cohesive character of the rubber material. In contrast, the surfaces 92 and 94 are required to move through a relatively small angle of about 70° in order to collapse on one another. The 70° movement is obtained with a relatively small pressure input from the pressure-producing material, and in practice the collapsing of surfaces 92 and 94 together is obtained without substantial collapsing of surfaces 90 and 92 on one another; similarly surfaces 90 and 96 are enabled to collapse on one another with no substantial "corrugating" action or "pressure store up" such as is obtained with the conventional arrangement exemplified by FIG. 5a.

The FIG. 13 embodiment corresponds in many respects to the FIG. 1 embodiment, especially in the inclusion of the two flat converging surfaces 38', 38' collapsible on one another in response to pressure increase. The interconnecting arcuate surfaces 42, 42' has a tendency to buckle outwardly on pressure increase to permit the desired collapsing action.

Each of the heretofore described embodiments of the invention incorporates a generally cylindrical piston. However a piston of other cross section can also be employed if desired. Thus, the FIG. 15 member is adapted to be utilized with a piston of oblong or rectangular cross section. For this purpose the cavity of the rubber member is formed of generally oblong configuration to define the opposed elongated surfaces 98 and the shortened interconnecting surfaces 100. Surfaces 100 are extended to the lower limit of the cavity while the surfaces 98 connect at line 101 with the two converging surfaces 102 and 103. The piston is preferably formed with a chisel tip at its lower end for engagement with surfaces 102 and 103. It will be understood that during pressure increase on the rubber member the surfaces 102 and 103 readily collapse on one another without substantial interference from surfaces 100; similarly surfaces 98 readily collapse on one another. As in the previously described embodiments there is a lack of any "pressure store up" as would delay return of the piston on reduction of the external pressure.

For illustration purposes specific embodiments of the invention have been shown and described herein. However it will be appreciated that various modifications and rearrangements may be resorted to without departing from the spirit of the invention as defined in the appended claims.

I claim:

1. In a power element, having a container and a piston having a tapered end extending therewithin, a deformable force-transmitting sock surrounding the piston, said container including an annular wall encircling said sock in spaced relation, pressure-producing material between said sock and encircling container wall for squeezing said sock to force said piston outwardly of said container, said sock defining two opposed internal flat surfaces converging at an angle to one another adjacent the tip of the piston, and other surfaces interconnecting said flat surfaces, whereby the development of exterior pressure on said sock is effective to collapse said flat surfaces together without substantial interference from said other surfaces.

2. In a power element, a container and a piston extensible therewithin, said piston being of generally cylindrical cross section for the major portion of its length and provided with a generally conical tip, a deformable force-transmitting sock surrounding said piston, said container including an annular wall encircling said sock in spaced relation, pressure-producing material between said sock and encircling container wall for squeezing said sock to force said piston outwardly of said container, said sock having a generally cylindrical interior surface for the major portion of its length and having two converging substantially flat surfaces at the end thereof, engageable with said piston tip, whereby the development of external pressure on said sock is effective to collapse said flat surfaces on one another without substantial interference from the surfaces therebetween.

3. In a power element having a container of pressure-producing material surrounding a force-transmitting sock defining a closed end bore adapted to receive a piston, the pressure-producing material being adapted to squeeze the sock upon thermal change to force the piston out of the bore, the improvement wherein the bore of the sock defines opposed elongated surfaces converging toward one another along a line at the closed end, whereby the development of pressure on the exterior of the sock by the pressure-producing material is effective to collapse said opposed surfaces on one another on repeated cycling of the power element.

4. In a power element having a container of pressure-producing material surrounding a force-transmitting sock defining a closed end bore receiving a piston, the pressure producing material being adapted to squeeze the sock upon thermal change to force the piston out of the bore, the improvement wherein the bore of the sock defines two opposed surfaces converging toward one another adjacent the closed end, whereby the development of pressure on the exterior of the sock by the pressure-producing material is effective to collapse said opposed surfaces on one another on repeated cycling of the power element.

5. In a power element having a container of pressure-producing material surrounding a force-transmitting sock defining a closed end bore receiving a piston, the pressure-producing material being adapted to squeeze the sock upon thermal change to force the piston out of the bore, the improvement wherein the bore of the sock defines at least two opposed generally flat elongated surfaces converging at an angle toward one another adjacent the closed end, whereby the development of pressure on the exterior of the sock by the pressure-producing material is effective to collapse said opposing surfaces on one another on repeated cycling of the power element.

References Cited in the file of this patent

FOREIGN PATENTS 1,037,722     Germany _____ Aug. 28, 1958